United States Patent
Nakasato et al.

(10) Patent No.: US 11,526,160 B2
(45) Date of Patent: Dec. 13, 2022

(54) FAILURE DETECTION SYSTEM AND FAILURE DETECTION METHOD

(71) Applicant: Tokyo Electron Limited, Tokyo (JP)

(72) Inventors: Yuka Nakasato, Yamanashi (JP); Masashi Takahashi, Iwate (JP); Miki Ouchi, Iwate (JP); Tomohiro Saito, Yamanashi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 0 days.

(21) Appl. No.: 17/075,800

(22) Filed: Oct. 21, 2020

(65) Prior Publication Data

US 2021/0124341 A1  Apr. 29, 2021

(30) Foreign Application Priority Data

Oct. 25, 2019  (JP) .............................. JP2019-193949

(51) Int. Cl.
*G05B 23/02* (2006.01)

(52) U.S. Cl.
CPC ....... *G05B 23/0221* (2013.01); *G05B 23/024* (2013.01)

(58) Field of Classification Search
CPC .......................... G05B 23/0221; G05B 23/024
See application file for complete search history.

(56) References Cited

U.S. PATENT DOCUMENTS

| 5,864,773 A * | 1/1999 | Barna ................ G05B 23/0297 702/85 |
| 6,356,857 B1 * | 3/2002 | Qin .......................... G05B 9/02 702/185 |
| 2008/0208385 A1 * | 8/2008 | Sakamoto ............... C23C 16/52 700/121 |
| 2013/0304419 A1 * | 11/2013 | Nakamura ........ H01L 21/67288 702/183 |
| 2017/0285613 A1 * | 10/2017 | Asai ..................... G05B 19/406 |

FOREIGN PATENT DOCUMENTS

JP  2007-305632 A  11/2007

* cited by examiner

*Primary Examiner* — Mischita L Henson
(74) *Attorney, Agent, or Firm* — Venjuris, P.C.

(57) ABSTRACT

A failure detection system detects a failure of a sensor that detects a state of a semiconductor manufacturing apparatus. The failure detection system includes a generation unit configured to generate times-series data of information on a detection value of the sensor during a determination period, a calculation unit configured to calculate a regression line of the times-series data, and a failure determination unit configured to determine whether the sensor has failed based on a slope of the regression line.

17 Claims, 9 Drawing Sheets

FAILURE DETECTION SYSTEM AND FAILURE DETECTION METHOD

CROSS-REFERENCE TO RELATED APPLICATION

This application is based on and claims priority from Japanese Patent Application No. 2019-193949 filed on Oct. 25, 2019 with the Japan Patent Office, the disclosure of which is incorporated herein in its entirety by reference.

TECHNICAL FIELD

The present disclosure relates to a failure detection system and a failure detection method.

BACKGROUND

A technique is known in which an abnormality is detected using a chart which displays time-series information measured by a semiconductor manufacturing apparatus, such as an SPC chart, a correlation chart, or an MD chart (see, e.g., Japanese Patent Laid-Open Publication No. 2007-305632).

SUMMARY

A failure detection system according to an aspect of the present disclosure detects a failure of a sensor that detects a state of a semiconductor manufacturing apparatus. The failure detection system includes a generation unit that generates time-series data of information on a detection value of the sensor in a determination period, a calculation unit that calculates a regression line of the time-series data, and a failure determination unit that determines whether the sensor has failed based on a slope of the regression line.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, non-limiting embodiments of the present disclosure will be described with reference to the accompanying drawings. In the accompanying drawings, the same or corresponding members or parts are denoted by the same or corresponding reference numerals, and redundant explanations thereof are omitted.

[Entire Configuration of System Including Semiconductor Manufacturing Apparatus]

Figure 1:
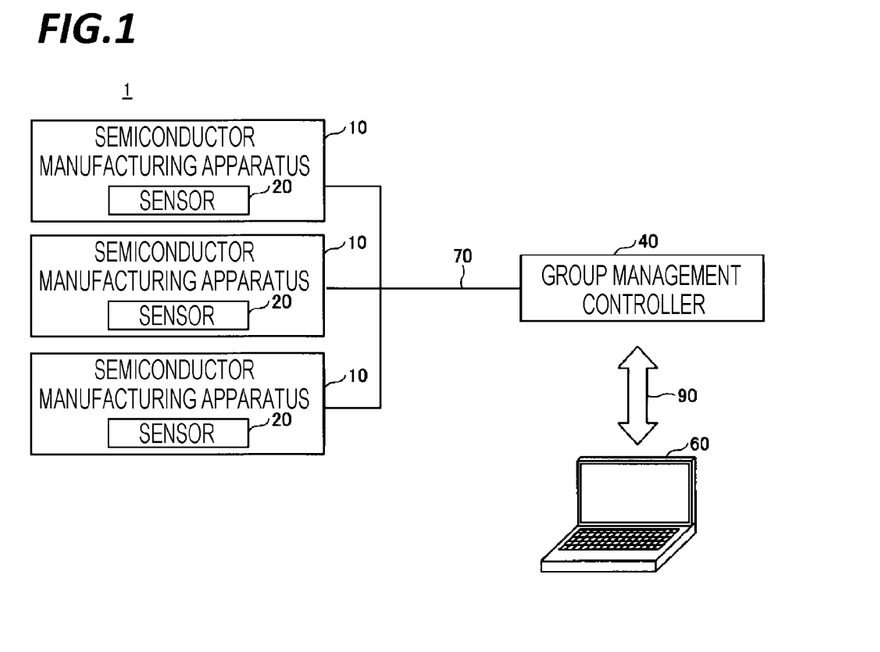
FIG. 1 is a diagram illustrating an example of the entire configuration of a system including a semiconductor manufacturing apparatus.

An entire configuration of a system including a semiconductor manufacturing apparatus will be described with reference to FIG. 1. FIG. 1 is a diagram illustrating an example of the entire configuration of the system including the semiconductor manufacturing apparatus.

The system 1 includes a plurality of semiconductor manufacturing apparatuses 10, a group management controller 40, and a terminal 60. Each semiconductor manufacturing apparatus 10 is communicatively connected to a group management controller 40 via a communication line 70 in a semiconductor factory. The group management controller 40 is communicatively connected to the terminal 60 via the communication line 90 of the semiconductor factory. The communication lines 70 and 90 are separated from, for example, an external network. However, the communication lines 70 and 90 may be communicatively connected to the external network.

[Semiconductor Manufacturing Apparatus]

The semiconductor manufacturing apparatus 10 executes various semiconductor manufacturing processes. The semiconductor manufacturing process includes various processes for manufacturing a semiconductor, such as a film forming process, an etching process, and a heat treatment. The semiconductor manufacturing apparatus 10 is provided with various sensors 20 that detect the state of the semiconductor manufacturing apparatus 10. As for the various sensors 20, for example, a fine differential pressure gauge provided in an exhaust pipe that exhausts the inside of a gas box, a temperature sensor that measures the temperature of a heater that heats a processing container or a raw material tank, and a pressure sensor that measures the pressure inside the processing container may be used.

The semiconductor manufacturing apparatus 10 may be, for example, a cluster type device in which a plurality of processing chambers is placed around a transfer chamber, or an in-line type device in which one processing chamber is placed in one transfer chamber. Further, the semiconductor manufacturing apparatus 10 may be, for example, a single-wafer type device, a semi-batch type device, or a batch type device. The single-wafer type device is, for example, a device that processes wafers one by one in a processing chamber. The semi-batch type device is, for example, a device that revolves a plurality of wafers placed on a rotary table in a processing chamber by the rotary table, and forms a film on the surface of a wafer by sequentially passing a region to which a source gas is supplied and a region to which a reaction gas that reacts with the source gas is supplied. The batch type device is, for example, a device that accommodates, in a processing chamber, a wafer boat in which a plurality of wafers is horizontally held at predetermined intervals in the height direction, and performs a process on the plurality of wafers at once. Further, although FIG. 1 illustrates three semiconductor manufacturing apparatuses 10, the number of semiconductor manufacturing apparatuses is not particularly limited.

The semiconductor manufacturing apparatus 10 may be communicatively connected to a host computer (not illustrated) via a communication line of a semiconductor factory. The host computer may be communicatively connected to an apparatus different from the semiconductor manufacturing apparatus 10 in the semiconductor factory, for example, an inspection apparatus that inspects a semiconductor manufactured by the semiconductor manufacturing apparatus 10 via a communication line of the semiconductor factory. The inspection apparatus includes, for example, a film thickness measuring apparatus, an electrical characteristic measuring apparatus, and an optical characteristic measuring apparatus.

[Group Management Controller]

The group management controller 40 acquires log data when the semiconductor manufacturing apparatus 10 executes a process, and stores the acquired log data. The log data includes detection values of various sensors 20. In addition, the group management controller 40 functions as a failure detection system that detects failures of various sensors 20 that detect the state of the semiconductor manufacturing apparatus 10.

Figure 2:
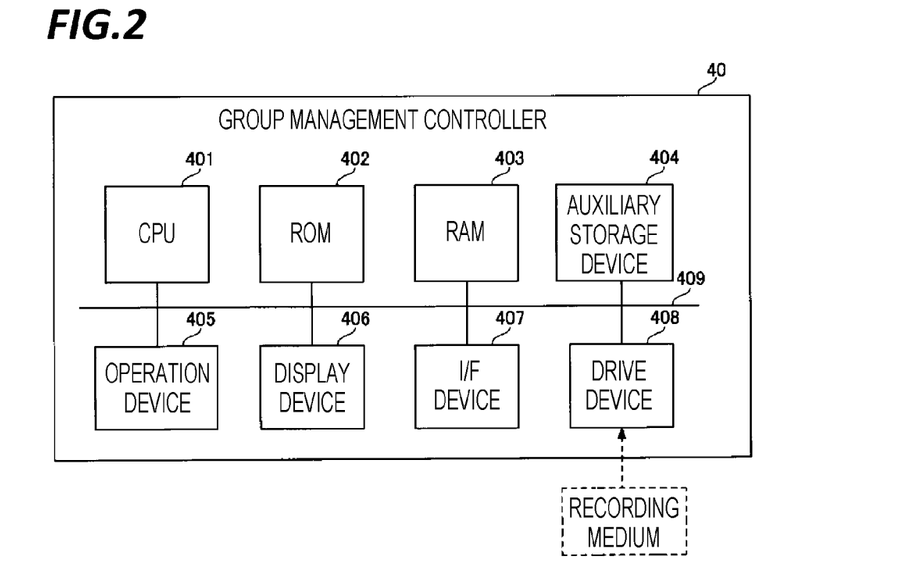
FIG. 2 is a diagram illustrating an example of a hardware configuration of a group management controller.

The hardware configuration of the group management controller 40 will be described with reference to FIG. 2. FIG. 2 is a diagram illustrating an example of a hardware configuration of the group management controller 40.

The group management controller 40 includes a central processing unit (CPU) 401, a read only memory (ROM) 402, and a random access memory (RAM) 403. The CPU 401, the ROM 402, and the RAM 403 form a so-called computer. The group management controller 40 also includes an auxiliary storage device 404, an operation device 405, a display device 406, an interface (I/F) device 407, and a drive device 408. The hardware of the group management controller 40 is connected to each other via a bus 409.

The CPU 401 executes various programs installed in the auxiliary storage device 404.

The ROM 402 is a non-volatile memory and functions as a main storage device. The ROM 402 stores various programs and data necessary for the CPU 401 to execute the various programs installed in the auxiliary storage device 404.

The RAM 403 is a volatile memory such as a dynamic random access memory (DRAM) or a static random access memory (SRAM), and functions as a main storage device. The RAM 403 provides a work area that is expanded when the various programs installed in the auxiliary storage device 404 are executed by the CPU 401.

The auxiliary storage device 404 stores various programs and log data of the semiconductor manufacturing apparatus 10 acquired by the various programs being executed by the CPU 401.

The operation device 405 is an input device used when an operator inputs various instructions to the group management controller 40. The display device 406 displays internal information of the group management controller 40.

The I/F device 407 is a connection device that connects to the communication line 70 to communicate with the semiconductor manufacturing apparatus 10.

The drive device 408 is a device that sets a recording medium. The recording medium includes a medium such as a CD-ROM, a flexible disk, or a magneto-optical disk that records information optically, electrically, or magnetically.

Further, the recording medium may include a semiconductor memory such as a ROM or a flash memory that electrically records information.

The various programs installed in the auxiliary storage device 404 are installed, for example, by setting the distributed recording medium in the drive device 408 and reading the various programs recorded in the recording medium by the drive device 408.

Figure 3:
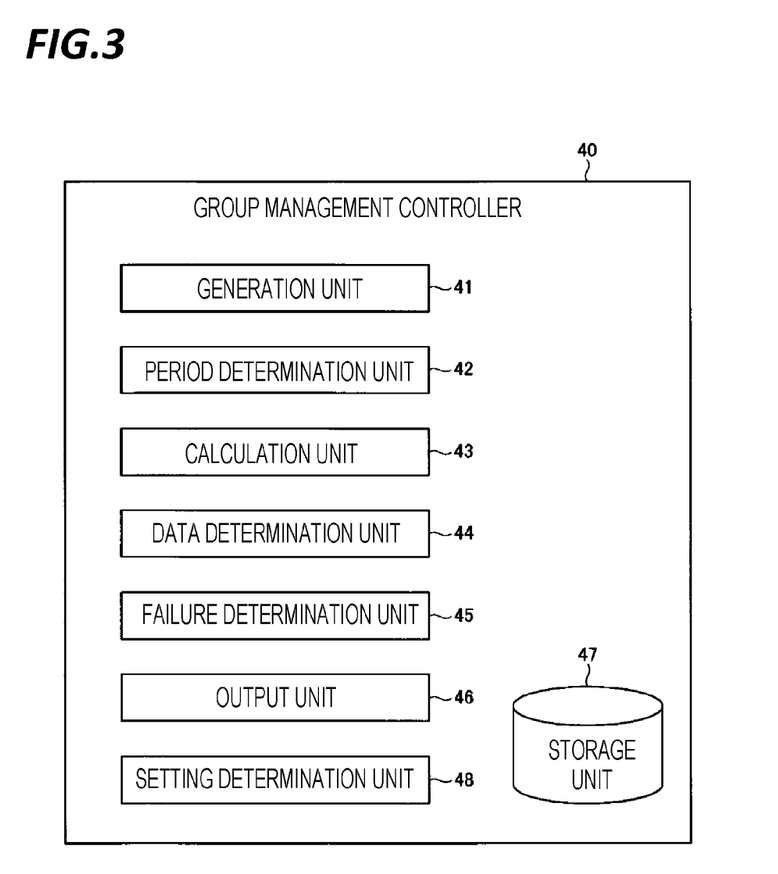
FIG. 3 is a diagram illustrating an example of a functional configuration of the group management controller.

The functional configuration of the group management controller 40 will be described with reference to FIG. 3. FIG. 3 is a diagram illustrating an example of a functional configuration of the group management controller 40.

The group management controller 40 includes a generation unit 41, a period determination unit 42, a calculation unit 43, a data determination unit 44, a failure determination unit 45, an output unit 46, a storage unit 47, and a setting determination unit 48.

The generation unit 41 generates time-series data in the determination period based on information on the detection value of the sensor 20 stored in the storage unit 47 (hereinafter, referred to as a "sensor value"). The time-series data is, for example, data in which the sensor value is associated with information about time. The information about time may be, for example, the date and time and the number of runs. The determination period is a period for defining the range of data used for determining a failure in the failure detection process, and is, for example, the number of days or the number of runs and is specified by the user using, for example, the terminal 60.

The period determination unit 42 determines whether the time-series data in the determination period generated by the generation unit 41 includes a sensor value for a period longer than the minimum required period. The minimum required period is a period shorter than the determination period, and is for example, the number of days or the number of runs and is specified by the user using, for example, the terminal 60.

Figure 4A:
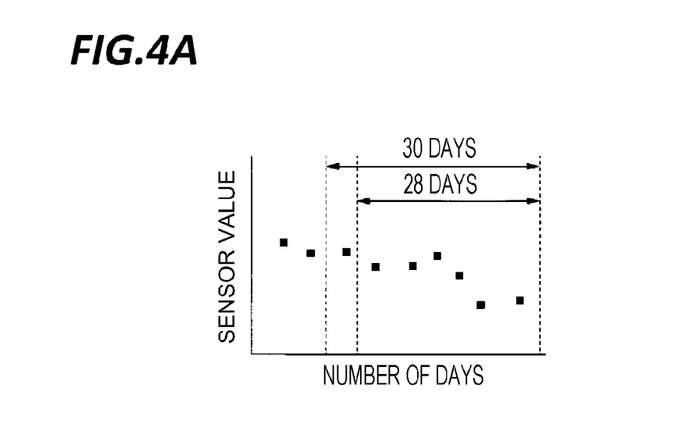
FIGS. 4A and 4B are diagrams illustrating an example of a minimum required period.
Figure 4B:
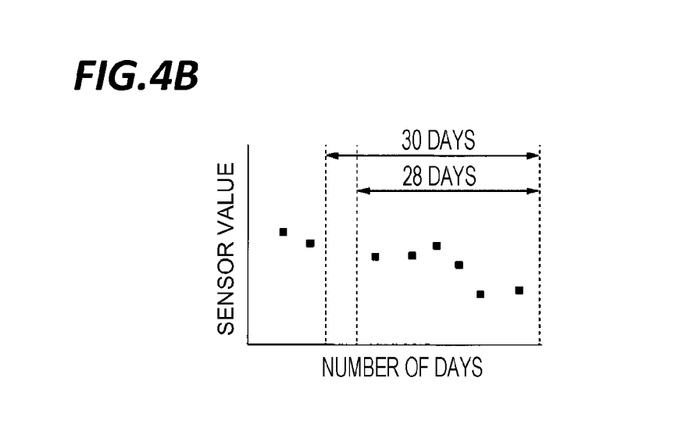

FIGS. 4A and 4B are diagrams illustrating an example of the minimum required period, and represent a case where the determination period is 30 days and the minimum required period is 28 days. In FIGS. 4A and 4B, the horizontal axis indicates the number of days, and the vertical axis indicates the sensor value.

In FIG. 4A, the sensor value exists within the past 30 days from the present time point and 28 days or more from the present time point. Therefore, the period determination unit 42 determines that the time-series data in the determination period includes the sensor value for a period equal to or longer than the minimum required period.

In FIG. 4B, there is no information on the detection value of the sensor 20 within the past 30 days from the present time point and 28 days or more from the present time point. Therefore, the period determination unit 42 determines that the time-series data in the determination period does not include the sensor value for a period equal to or longer than the minimum required period.

The calculation unit 43 calculates the regression line of the time-series data based on the time-series data in the determination period generated by the generation unit 41. When the regression line is calculated, data including, for example, the slope of the regression line and the determination coefficient is obtained.

The calculation unit 43 also calculates the change amount in the sensor value during the determination period. The change amount may be, for example, a change amount calculated based on two pieces of data in the determination period. The two pieces of data are preferably the latest data and the oldest data in, for example, the determination period.

The data determination unit 44 determines whether the determination coefficient of the regression line calculated by the calculation unit 43 is equal to or larger than a control value. The control value is in the range of, for example, 0.01 to 0.99 and is specified by the user using, for example, the terminal 60.

Figure 5A:
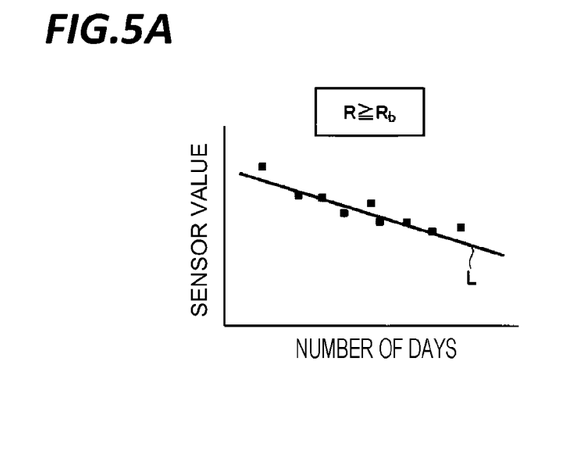
FIGS. 5A and 5B are diagrams illustrating an example of a regression line.
Figure 5B:
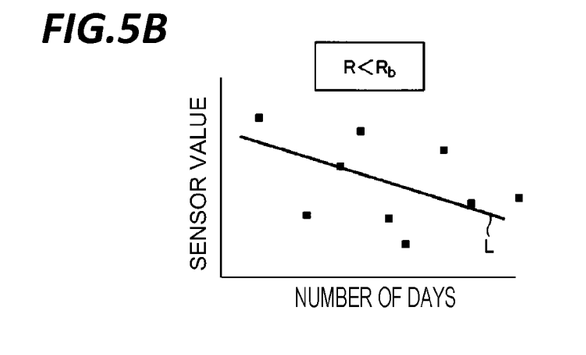

FIGS. 5A and 5B are diagrams illustrating an example of the regression line. FIG. 5A illustrates an example in which the determination coefficient R of the regression line L is equal to or larger than the control value $R_b$ ($R \geq R_b$), and FIG. 5B illustrates an example in which the determination coefficient R of the regression line L is less than the control value $R_b$ ($R < R_b$). In FIGS. 5A and 5B, the horizontal axis indicates the number of days, and the vertical axis indicates the sensor value.

As represented in FIG. 5A, when the determination coefficient R of the regression line L is equal to or larger than the control value $R_b$, the calculated regression line L fits well with respect to the sensor value. Meanwhile, as represented in FIG. 5B, when the determination coefficient R of the regression line L is less than the control value $R_b$, the calculated regression line L does not fit well with respect to the sensor value.

The failure determination unit 45 determines whether the sensor 20 has failed based on the slope of the regression line calculated by the calculation unit 43. For example, the failure determination unit 45 determines that the sensor 20 has failed when the slope of the regression line is outside the control value. The control value includes, for example, a control upper limit value and a control lower limit value, and the failure determination unit 45 determines that the sensor 20 has failed when the slope of the regression line is equal to or larger than the control upper limit value or equal to or less than the control lower limit value. The control value is specified by the user using, for example, the terminal 60.

Further, the failure determination unit 45 determines whether the sensor 20 has failed based on the change amount in the sensor value during the determination period. For example, the failure determination unit 45 determines that the sensor 20 has failed when the change amount in the sensor value during the determination period is outside the control value. The control value includes, for example, a control upper limit value and a control lower limit value, and the failure determination unit 45 determines that the sensor 20 has failed when the change amount in the sensor value during the determination period is equal to or larger than the control upper limit value or equal to or less than the control lower limit value. The control value is specified by the user using, for example, the terminal 60.

The output unit 46 informs that the sensor 20 has failed when the failure determination unit 45 determines that the sensor 20 has failed. For example, the output unit 46 displays the detection result by the failure determination unit 45 on the display device 406 of the group management controller 40 or the display unit of the terminal 60. The detection result includes, for example, the date and time when the failure is detected, the level of the failure, and the calculated value obtained when the failure detection process is executed. The level of the failure includes, for example, an error and a warning. The calculated value includes, for example, the determination coefficient of the regression line, the slope of the regression line, and the change amount in the sensor value.

In addition, when the setting determination unit 48 to be described later determines that the behavior after the abnormality determination in the semiconductor manufacturing apparatus 10 is a warning notification setting, the output unit 46 notifies the semiconductor manufacturing apparatus 10 of a warning. For example, the output unit 46 outputs a warning signal to the semiconductor manufacturing apparatus 10.

In addition, when the setting determination unit 48 to be described later determines that the behavior after the abnormality determination in the semiconductor manufacturing apparatus 10 is an alarm notification setting, the output unit 46 notifies the semiconductor manufacturing apparatus 10 of an alarm. For example, the output unit 46 outputs an alarm signal to the semiconductor manufacturing apparatus 10.

The storage unit 47 stores the sensor value acquired by an acquisition unit. The sensor value is stored in the storage unit, for example, every time the process is executed in the semiconductor manufacturing apparatus 10. The sensor value may be, for example, an average value of the detection values of the sensor 20 while the process is executed in the semiconductor manufacturing apparatus 10. The sensor value is stored in the storage unit 47 as time-series data in association with time-related information. The storage unit 47 also stores the regression line data of the time-series data calculated by the calculation unit 43, and the detection result by the failure determination unit 45.

The setting determination unit 48 determines whether the behavior after the abnormality determination in the semiconductor manufacturing apparatus 10 is a warning notification setting. The phrase "warning notification setting" means a setting in which the group management controller 40 notifies the semiconductor manufacturing apparatus 10 of a warning. Meanwhile, the phrase "not a warning notification setting" means a setting in which the group management controller 40 does not notify the semiconductor manufacturing apparatus 10 of a warning.

Further, the setting determination unit 48 determines whether the behavior after the abnormality determination in the semiconductor manufacturing apparatus 10 is an alarm notification setting. The phrase "alarm notification setting" means a setting in which the group management controller 40 notifies the semiconductor manufacturing apparatus 10 of an alarm. Meanwhile, the phrase "not an alarm notification setting" means a setting in which the group management controller 40 does not notify the semiconductor manufacturing apparatus 10 of an alarm.

[Failure Detection Process]

Descriptions will be made on a process of detecting a failure of the sensor 20, which is provided in the semiconductor manufacturing apparatus 10, and executed by the group management controller 40 (hereinafter, referred to as a "failure detection process"). In the following, a failure detection process performed on one of the plurality of semiconductor manufacturing apparatuses 10 will be described as an example.

Figure 6:
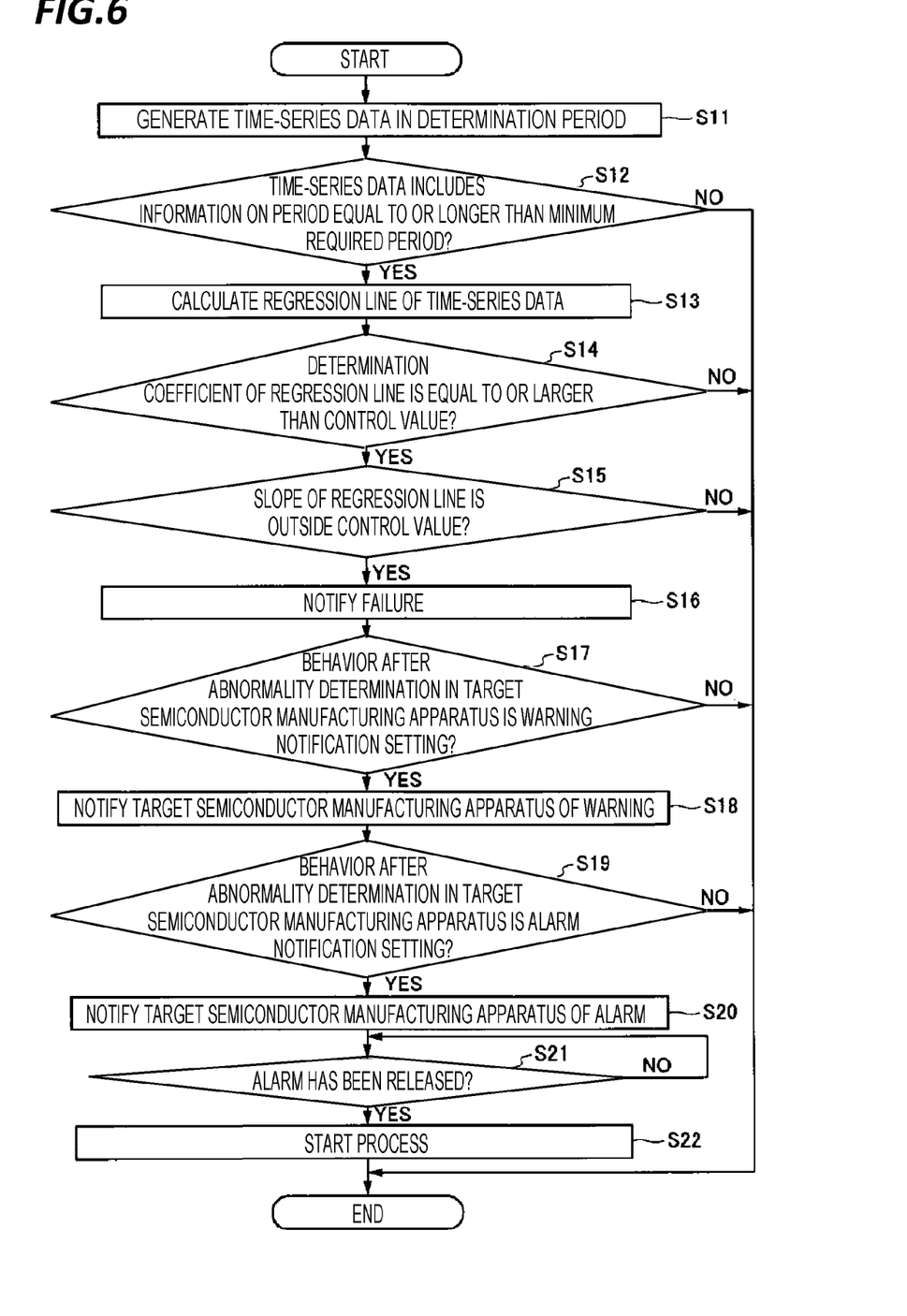
FIG. 6 is a flowchart illustrating an example of a failure detection process.

FIG. 6 is a flowchart illustrating an example of the failure detection process. The failure detection process illustrated in FIG. 6 is executed, for example, when an operator operates the operation device 405 or the terminal 60. However, a method of starting the failure detection process illustrated in FIG. 6 is not particularly limited. For example, the group management controller 40 may be configured to automatically execute the failure detection process at a predetermined timing regardless of the operation of the operator. The predetermined timing may be, for example, before the start of each run in the semiconductor manufacturing apparatus 10 or after the end of the run, and after a predetermined number of days has elapsed after the failure detection process is executed.

In a step S11, the generation unit 41 generates time-series data in the designated determination period based on the sensor value stored in the storage unit 47.

In a step S12, the period determination unit 42 determines whether the time-series data generated by the generation unit 41 includes a sensor value for a period equal to or longer than the minimum required period. When it is determined in the step S12 that the time-series data generated by the generation unit 41 includes the sensor value for a period equal to or longer than the minimum required period, the process proceeds to a step S13. Meanwhile, when it is determined in the step S12 that the time-series data generated by the generation unit 41 does not include the sensor value for a period equal to or longer than the minimum required period, the process ends without determining the failure of the sensor 20.

In the step S13, the calculation unit 43 calculates the regression line of the time-series data based on the time-series data generated by the generation unit 41. When the regression line is calculated, data including, for example, the slope of the regression line and the determination coefficient is obtained.

In a step S14, the data determination unit 44 determines whether the determination coefficient of the regression line calculated by the calculation unit 43 is equal to or larger than the control value. When it is determined in the step S14 that the determination coefficient of the regression line calculated by the calculation unit 43 is equal to or larger than the control value, the process proceeds to a step S15. Meanwhile, when it is determined in the step S14 that the determination coefficient of the regression line calculated by the calculation unit 43 is less than the control value, the process ends without determining the failure of the sensor 20.

In the step S15, the failure determination unit 45 determines whether the slope of the regression line calculated by the calculation unit 43 is outside the control value. In the step S15, when the slope of the regression line calculated by the calculation unit 43 is determined to be outside the control value, it is determined that the sensor 20 provided in the target semiconductor manufacturing apparatus 10 has failed (is abnormal), and the process proceeds to a step S16. Meanwhile, when it is determined in the step S15 that the slope of the regression line calculated by the calculation unit 43 is within the control value, it is determined that the sensor 20 provided in the target semiconductor manufacturing apparatus 10 has not failed (is not abnormal), the process ends.

In the step S16, the output unit 46 notifies that the sensor 20 has failed. For example, the output unit 46 displays the detection result by the failure determination unit 45 on the display device 406 of the group management controller 40 or the display unit of the terminal 60.

In a step S17, the setting determination unit 48 determines whether the behavior after the abnormality determination in the target semiconductor manufacturing apparatus 10 is a warning notification setting. In the step S17, when the setting determination unit 48 determines that the behavior after the abnormality determination in the target semiconductor manufacturing apparatus 10 is the warning notification setting, the process proceeds to a step S18. Meanwhile, in the step S17, when the setting determination unit 48 determines that the behavior after the abnormality determination in the target semiconductor manufacturing apparatus 10 is not the warning notification setting, the process ends.

In the step S18, the output unit 46 notifies the target semiconductor manufacturing apparatus 10 of the warning. For example, the output unit 46 outputs a warning signal to the semiconductor manufacturing apparatus 10. Upon receiving the warning signal, the target semiconductor manufacturing apparatus 10 displays, for example, occurrence of a warning on the display unit (not illustrated) of the semiconductor manufacturing apparatus 10.

In a step S19, the setting determination unit 48 determines whether the behavior after the abnormality determination in the target semiconductor manufacturing apparatus 10 is an alarm notification setting. In the step S19, when the setting determination unit 48 determines that the behavior after the abnormality determination in the target semiconductor manufacturing apparatus 10 is the alarm notification setting, the process proceeds to a step S20. Meanwhile, in the step S19, when the setting determination unit 48 determines that the behavior after the abnormality determination in the target semiconductor manufacturing apparatus 10 is not the alarm notification setting, the process ends.

In the step S20, the output unit 46 notifies the target semiconductor manufacturing apparatus 10 of the alarm. For example, the output unit 46 outputs an alarm signal to the semiconductor manufacturing apparatus 10. Upon receiving the alarm signal, the target semiconductor manufacturing apparatus 10 displays, for example, occurrence of an alarm on the display unit (not illustrated) of the semiconductor manufacturing apparatus 10. Further, upon receiving the alarm signal, the target semiconductor manufacturing apparatus 10 stops, for example, a process being executed or a process after completion of the process being executed.

In a step S21, the target semiconductor manufacturing apparatus 10 determines whether the alarm has been released by the operator. When it is determined in the step S21 that the alarm has been released, the process proceeds to a step S22. Meanwhile, when it is determined in the step S21 that the alarm has not been released, the step S21 is repeated, that is, the process is not restarted.

In the step S22, the target semiconductor manufacturing apparatus 10 starts executing the process and then, ends the process.

Figure 7:
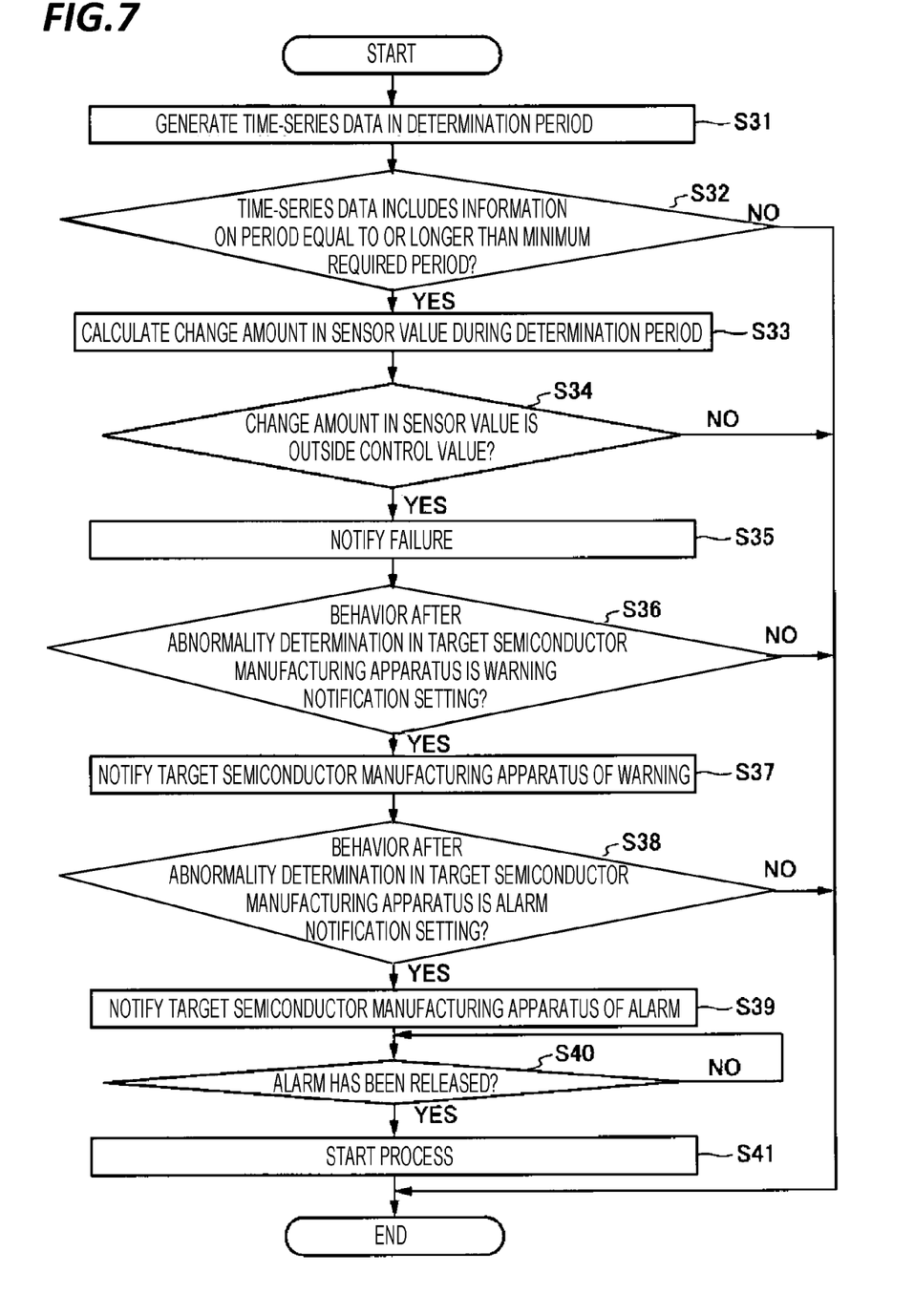
FIG. 7 is a flowchart illustrating another example of the failure detection process.

FIG. 7 is a flowchart illustrating another example of a failure detection process. The failure detection process illustrated in FIG. 7 is executed, for example, when an operator operates the operation device 405 or the terminal 60. However, a method of starting the failure detection process illustrated in FIG. 7 is not particularly limited. For example, the group management controller 40 may be configured to automatically execute the failure detection process at a predetermined timing regardless of the operation of the operator. The predetermined timing may be, for example, before the start of each run in the semiconductor manufacturing apparatus 10 or after the end of the run, and after a predetermined number of days has elapsed after the failure detection process is executed.

In a step S31, the generation unit 41 generates time-series data in the designated determination period based on the sensor value stored in the storage unit 47.

In a step S32, the period determination unit 42 determines whether the time-series data generated by the generation unit 41 includes a sensor value for a period equal to or longer than the minimum required period. When it is determined in the step S32 that the time-series data generated by the generation unit 41 includes the sensor value for a period equal to or longer than the minimum required period, the process proceeds to a step S33. Meanwhile, when it is determined in the step S32 that the time-series data generated by the generation unit 41 does not include the sensor value for a period equal to or longer than the minimum required period, the process ends without determining the failure of the sensor 20.

In the step S33, the calculation unit 43 calculates the change amount in the sensor value during the determination period.

In a step S34, the failure determination unit 45 determines whether the change amount in the sensor value during the determination period calculated by the calculation unit 43 is outside the control value. In the step S34, when the change amount in the sensor value during the determination period calculated by the calculation unit 43 is outside the control value, it is determined that the sensor 20 provided in the target semiconductor manufacturing apparatus 10 has failed (is abnormal), and the process proceeds to a step S35. Meanwhile, when it is determined in the step S34 that the change amount in the sensor value during the determination period calculated by the calculation unit 43 is within the control value, it is determined that the sensor 20 provided in the target semiconductor manufacturing apparatus 10 has not failed (is not abnormal), the process ends.

In the step S35, the output unit 46 notifies that the sensor 20 has failed. For example, the output unit 46 displays the detection result by the failure determination unit 45 on the display device 406 of the group management controller 40 or the display unit of the terminal 60.

In a step S36, the setting determination unit 48 determines whether the behavior after the abnormality determination in the target semiconductor manufacturing apparatus 10 is a warning notification setting. In the step S36, when the setting determination unit 48 determines that the behavior after the abnormality determination in the target semiconductor manufacturing apparatus 10 is the warning notification setting, the process proceeds to a step S37. Meanwhile, in the step S36, when the setting determination unit 48 determines that the behavior after the abnormality determination in the target semiconductor manufacturing apparatus 10 is not the warning notification setting, the process ends.

In the step S37, the output unit 46 notifies the target semiconductor manufacturing apparatus 10 of a warning. For example, the output unit 46 outputs a warning signal to the semiconductor manufacturing apparatus 10. Upon receiving the warning signal, the target semiconductor manufacturing apparatus 10 displays, for example, occurrence of a warning on the display unit (not illustrated) of the semiconductor manufacturing apparatus 10.

In a step S38, the setting determination unit 48 determines whether the behavior after the abnormality determination in the target semiconductor manufacturing apparatus 10 is an alarm notification setting. In the step S38, when the setting determination unit 48 determines that the behavior after the abnormality determination in the target semiconductor manufacturing apparatus 10 is the alarm notification setting, the process proceeds to a step S39. Meanwhile, in the step S38, when the setting determination unit 48 determines that the behavior after the abnormality determination in the target semiconductor manufacturing apparatus 10 is not the alarm notification setting, the process ends.

In a step S39, the output unit 46 notifies the target semiconductor manufacturing apparatus 10 of an alarm. For example, the output unit 46 outputs an alarm signal to the semiconductor manufacturing apparatus 10. Upon receiving the alarm signal, the target semiconductor manufacturing apparatus 10 displays, for example, occurrence of an alarm on the display unit (not illustrated) of the semiconductor manufacturing apparatus 10. Further, upon receiving the alarm signal, the target semiconductor manufacturing apparatus 10 stops, for example, a process being executed or a process after completion of the process being executed.

In a step S40, the target semiconductor manufacturing apparatus 10 determines whether the alarm has been released by the operator. When it is determined in the step S40 that the alarm has been released, the process proceeds to a step S41. Meanwhile, when it is determined in the step S40 that the alarm has not been released, the step S40 is repeated, that is, the process is not restarted.

In the step S41, the target semiconductor manufacturing apparatus 10 starts executing the process and then ends the process.

Effect

The effects caused by the failure detection system and the failure detection method according to the embodiment will be described. First, a case is considered where the sensor 20 is abnormal when the sensor value changes rapidly with the lapse of days, and the sensor 20 is not abnormal when the sensor value gradually changes.

Figure 8A:
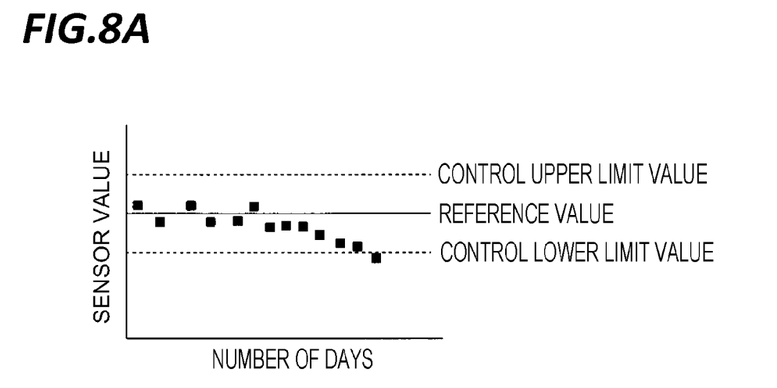
FIGS. 8A and 8B are diagrams illustrating an example of a determination result of the failure detection process.
Figure 8B:
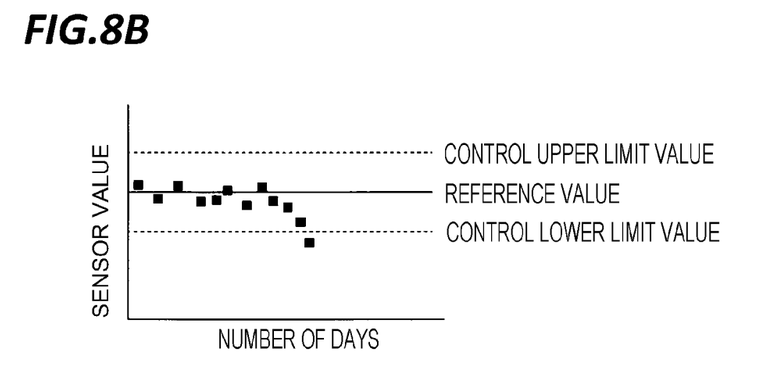

FIGS. 8A and 8B are diagrams illustrating an example of a determination result of the failure detection process. In FIGS. 8A and 8B, the horizontal axis indicates the number of days, and the vertical axis indicates the sensor value. Further, in FIGS. 8A and 8B, a reference value is indicated by a solid line, and a control upper limit value and a control lower limit value are indicated by broken lines.

Regarding a determination on whether the sensor 20 is abnormal based on the time-series data of the sensor value, as illustrated in FIG. 8A, when the sensor value gradually changes with the lapse of days and falls below the control lower limit value, it is determined whether the sensor 20 has failed. Further, as illustrated in FIG. 8B, when the sensor value rapidly changes with the lapse of days and falls below the control lower limit value, it is determined whether the sensor 20 has failed. When the presence or absence of abnormality of the sensor 20 is determined based on the time-series data of the sensor value in this way, it is difficult to deal with a case where the presence or absence of abnormality changes depending on a method of changing the sensor value.

Figure 9A:
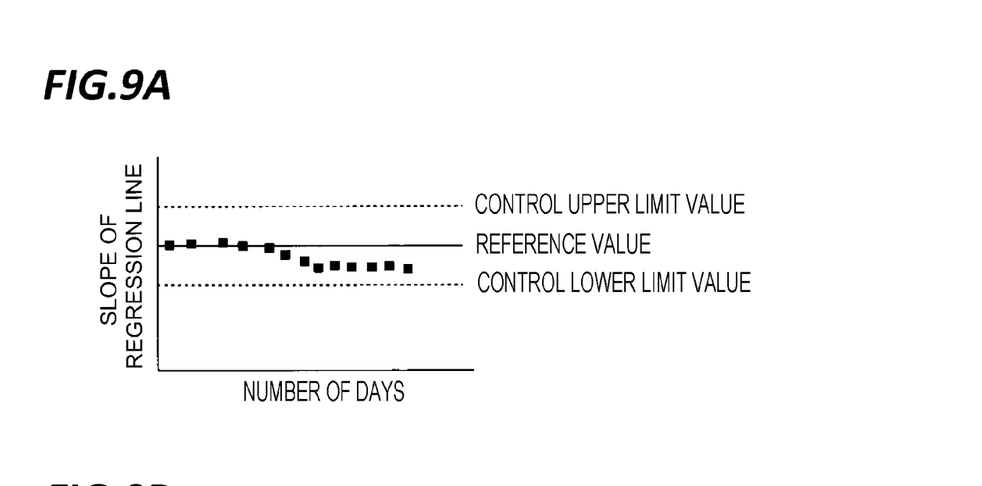
FIGS. 9A and 9B are diagrams illustrating another example of the determination result of the failure detection process.
Figure 9B:
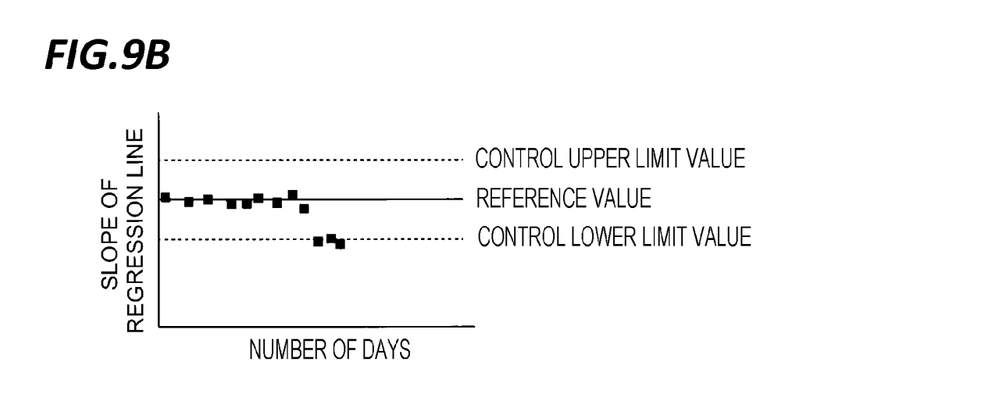

FIGS. 9A and 9B are diagrams illustrating another example of the determination result of the failure detection process. FIGS. 9A and 9B illustrate time-series data of a slope of the regression line which is calculated based on the time-series data illustrated in FIGS. 8A and 8B, respectively. In FIGS. 9A and 9B, the horizontal axis indicates the number of days, and the vertical axis indicates the slope of the regression line calculated based on the sensor value. Further, in FIGS. 8A and 8B, a reference value is indicated by a solid line, and a control upper limit value and a control lower limit value are indicated by broken lines.

When the presence or absence of abnormality of the sensor 20 is determined based on the time-series data of the slope of the regression line, even when the information on the detection value gradually changes with the number of days, the slope of the regression line does not fall below the control lower limit value as illustrated in FIG. 9A, and it is not determined that the sensor 20 has failed. In addition, when the information on the detection value changes rapidly with the number of days, the slope of the regression line falls below the control lower limit value as illustrated in FIG. 9B, and it is determined that the sensor 20 has failed. When the presence or absence of abnormality of the sensor 20 is determined based on the slope of the regression line in this way, an erroneous detection may be suppressed and the failure of the sensor 20 may be detected with higher accuracy.

Figure 10A:
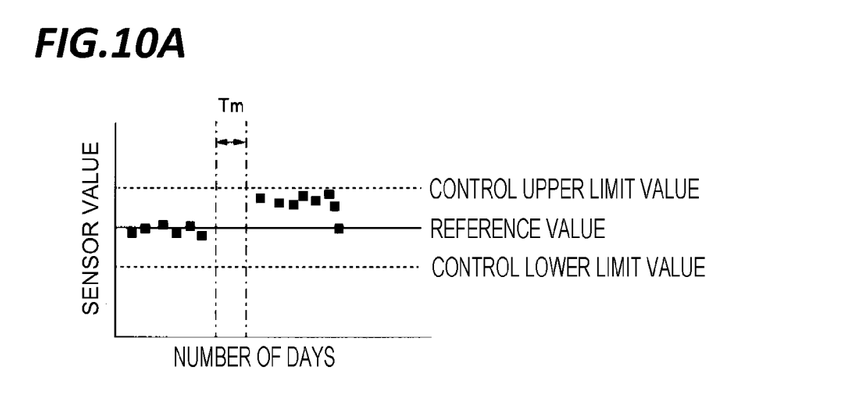
FIGS. 10A and 10B are diagrams illustrating still another example of the determination result of the failure detection process.
Figure 10B:
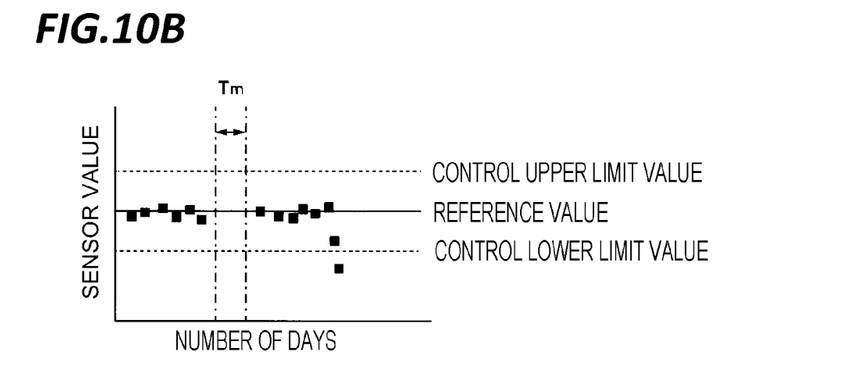

FIGS. 10A and 10B are diagrams illustrating still another example of the determination result of the failure detection process, which represents time-series data of sensor values before and after maintenance of the semiconductor manufacturing apparatus 10 and time-series data of the slope of the regression line calculated based on the time-series data. FIG. 10A illustrates time-series data of sensor values, and FIG. 10B illustrates time-series data of the slope of the regression line calculated based on the time-series data illustrated in FIG. 10A. In FIG. 10A, the horizontal axis indicates the number of days, and the vertical axis indicates the sensor value. In FIG. 10B, the horizontal axis indicates the number of days, and the vertical axis indicates the slope of the regression line calculated based on the sensor value. Further, in FIGS. 10A and 10B, a reference value is indicated by a solid line, and a control upper limit value and a control lower limit value are indicated by broken lines.

When the maintenance the semiconductor manufacturing apparatus 10 is performed, as illustrated in FIG. 10A, the sensor value may change significantly before and after the maintenance period Tm. In this case, when the presence or absence of abnormality of the sensor 20 is determined based on the time-series data of the sensor value, even when the sensor value rapidly changes with the lapse of days after maintenance as illustrated in FIG. 10A, it may not be determined that the sensor 20 has failed. When the presence or absence of abnormality of the sensor 20 is determined based on the time-series data of the slope of the regression line, and when the sensor value changes rapidly with the lapse of days after maintenance, the slope of the regression line falls below the control lower limit value, and the sensor 20 is determined to have failed. When the presence or absence of abnormality of the sensor 20 is determined based on the slope of the regression line in this way, an erroneous detection may be suppressed and the failure of the sensor 20 may be detected with higher accuracy.

In addition, in the above-described embodiment, descriptions have been made on the case where the presence or absence of the failure of the sensor 20 is determined based on the slope of the regression line or the change amount in the sensor value, but the present disclosure is not limited thereto. The presence or absence of failure of the sensor 20 may be determined based on, for example, the slope of the regression line and the change amount in the sensor value. In this case, for example, when the slope of the regression line is outside the control value and the change amount in the sensor value is outside the control value, the failure determination unit 45 determines that the sensor 20 has failed.

Further, the presence or absence of failure of the sensor 20 may be determined based on, for example, the slope of the regression line and the sensor value. In this case, for example, when the slope of the regression line and the sensor value are outside the control value, the failure determination unit 45 determines that the sensor 20 has failed. Further, the presence or absence of failure of the sensor 20 may be determined based on, for example, the change amount in the sensor value and the sensor value. In this case, for example, when the change amount in the sensor value and the sensor value are outside the control value, the failure determination unit 45 determines that the sensor 20 has failed. Also, the presence or absence of failure of the sensor 20 may be determined based on, for example, the slope of the regression line, the change amount in the sensor value, and the sensor value. In this case, for example, when the slope of the regression line, the change amount in the sensor value, and the sensor value are outside the control value, the failure determination unit 45 determines that the sensor 20 has failed.

According to the present disclosure, a failure of a sensor that detects the state of a semiconductor manufacturing apparatus may be detected with higher accuracy.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A failure detection system comprising:
    a generation circuitry configured to generate times-series data of information on a detection value of a sensor for detecting a state of a semiconductor manufacturing apparatus in a determination period;
    a calculation circuitry configured to calculate a change amount of the detection value in the determination period; and
    a failure determination circuitry configured to determine that the sensor has failed when the change amount of the detection value in the determination period is outside a control value.

2. The failure detection system according to claim 1, wherein the calculation circuitry is configured to calculate a regression line of the times-series data, and
    wherein the failure determination circuitry determines that the sensor has failed when a slope of the regression line is outside the control value.

3. The failure detection system according to claim 2, further comprising:
    a period determination circuitry configured to determine whether the time-series data includes the information on the detection value of the sensor in a minimum required period or more which is shorter than the determination period,
    wherein when the period determination circuitry determines that the time-series data does not include the information on the detection value of the sensor in the minimum required period or more which is shorter than the determination period, the failure determination circuitry does not determine whether the sensor has failed.

4. The failure detection system according to claim 3, further comprising:
    a data determination circuitry configured to determine whether a determination coefficient of the regression line is equal to or larger than the control value,
    wherein when the data determination circuitry determines that the determination coefficient of the regression line is less than the control value, the failure determination circuitry does not determine whether the sensor has failed.

5. The failure detection system according to claim 4, further comprising:
    an output circuitry configured to inform that the sensor is abnormal when determined that the sensor has failed.

6. The failure detection system according to claim 5, further comprising:
    a storage configured to store the information on the detection value of the sensor each time a process is executed in the semiconductor manufacturing apparatus.

7. The failure detection system according to claim 6, wherein the sensor includes at least one of a fine differential pressure gauge, a temperature sensor, and a pressure sensor attached to the semiconductor manufacturing apparatus.

8. The failure detection system according to claim 2, the failure determination circuitry determines that the sensor has failed when the slope of the regression line is equal to or larger than a control upper limit value or equal to or less than a control lower limit value.

9. The failure detection system according to claim 1, further comprising:
a period determination circuitry configured to determine whether the time-series data includes the information on the detection value of the sensor in a minimum required period or more which is shorter than the determination period,
wherein when the period determination circuitry determines that the time-series data does not include the information on the detection value of the sensor in the minimum required period or more which is shorter than the determination period, the failure determination circuitry does not determine whether the sensor has failed.

10. The failure detection system according to claim 1, further comprising:
a data determination circuitry configured to determine whether a determination coefficient of the regression line is equal to or larger than a control value,
wherein when the data determination circuitry determines that the determination coefficient of the regression line is less than the control value, the failure determination circuitry does not determine whether the sensor has failed.

11. The failure detection system according to claim 1, wherein the information on the detection value of the sensor is an average value of the detection value of the sensor while a process is executed in the semiconductor manufacturing apparatus.

12. The failure detection system according to claim 1, wherein the change amount is calculated based on a latest data and an oldest data in the determination period.

13. The failure detection system according to claim 1, further comprising:
an output circuitry configured to inform that the sensor is abnormal when determined that the sensor has failed.

14. The failure detection system according to claim 1, further comprising:
a storage configured to store the information on the detection value of the sensor each time a process is executed in the semiconductor manufacturing apparatus.

15. The failure detection system according to claim 1, wherein the sensor includes at least one of a fine differential pressure gauge, a temperature sensor, and a pressure sensor attached to the semiconductor manufacturing apparatus.

16. A failure detection system comprising:
a generation circuitry configured to generate times-series data of information on a detection value of a sensor for detecting a state of a semiconductor manufacturing apparatus in a determination period;
a calculation circuitry configured to calculate a regression line of the times-series data; and
a failure determination circuitry configured to determine whether the sensor has failed based on a slope of the regression line,
wherein the calculation circuitry calculates a change amount of the detection value in the determination period, and
when the change amount of the detection value in the determination period is outside a control value, the failure determination circuitry determines that the sensor has failed.

17. A failure detection method comprising:
generating time-series data of information on a detection value of a sensor for detecting a state of a semiconductor manufacturing apparatus in a determination period;
calculating a change amount of the detection value in the determination period; and
determining that the sensor has failed when the change amount of the detection value in the determination period is outside a control value.

* * * * *